(12) United States Patent
Kaisermayr

(10) Patent No.: US 8,671,081 B2
(45) Date of Patent: Mar. 11, 2014

(54) DATA PROCESSING SYSTEMS AND METHODS TO ENSURE THE CONSISTENCY OF DATA

(75) Inventor: Martin Kaisermayr, Antibes (FR)

(73) Assignee: SAP AG, Walldorf (DE)

( * ) Notice: Subject to any disclaimer, the term of this patent is extended or adjusted under 35 U.S.C. 154(b) by 623 days.

(21) Appl. No.: 12/292,941

(22) Filed: Dec. 1, 2008

(65) Prior Publication Data

US 2010/0070797 A1 Mar. 18, 2010

(30) Foreign Application Priority Data

Sep. 18, 2008 (EP) .................................... 08290881

(51) Int. Cl.
*G06F 7/00* (2006.01)
*G06F 17/00* (2006.01)

(52) U.S. Cl.
USPC .......................................... 707/691; 707/690

(58) Field of Classification Search
USPC .......................................... 707/690, 691, 697
See application file for complete search history.

(56) References Cited

U.S. PATENT DOCUMENTS

| | | | |
|---|---|---|---|
| 6,480,970 B1 * | 11/2002 | DeKoning et al. | 714/6.12 |
| 6,745,303 B2 * | 6/2004 | Watanabe | 711/161 |
| 7,117,323 B1 * | 10/2006 | Delaney | 711/162 |
| 7,337,194 B2 * | 2/2008 | Goyal | 1/1 |
| 7,908,249 B1 * | 3/2011 | Gupta et al. | 707/655 |
| 2003/0158873 A1 * | 8/2003 | Sawdon et al. | 707/204 |
| 2003/0159007 A1 * | 8/2003 | Sawdon et al. | 711/154 |
| 2005/0144202 A1 * | 6/2005 | Chen | 707/205 |
| 2006/0036574 A1 * | 2/2006 | Schweigkoffer et al. | 707/2 |
| 2006/0112151 A1 * | 5/2006 | Manley et al. | 707/201 |
| 2006/0282485 A1 * | 12/2006 | Aggarwal et al. | 707/206 |
| 2007/0088754 A1 * | 4/2007 | Brannon et al. | 707/200 |
| 2008/0005201 A1 * | 1/2008 | Ting et al. | 707/204 |
| 2008/0244008 A1 * | 10/2008 | Wilkinson et al. | 709/205 |
| 2009/0100133 A1 * | 4/2009 | Giulio et al. | 709/203 |

* cited by examiner

*Primary Examiner* — Etienne LeRoux
*Assistant Examiner* — Jared Bibbee
(74) *Attorney, Agent, or Firm* — Finnegan, Henderson, Farabow, Garrett & Dunner LLP

(57) ABSTRACT

Data processing systems and methods are provided for correcting data inconsistencies within one or more databases and/or data repositories. In accordance with one implementation, a correction module is selected from a set of correction modules, and the selected correction module is configured to correct data inconsistencies of a solvable data inconsistency type. Data having an data inconsistency of the solvable data inconsistency type is identified within one or more databases or data repositories. If the selected correction module is unassociated with an obstacle data inconsistency type, or if the identified data not include an inconsistency of the obstacle data inconsistency type, then the correction module corrects the data inconsistency within the identified data.

33 Claims, 6 Drawing Sheets

DATA PROCESSING SYSTEMS AND METHODS TO ENSURE THE CONSISTENCY OF DATA

TECHNICAL FIELD

The present disclosure relates to the fields of data processing and database management. More specifically, and without limitation, the present disclosure relates to systems and methods for correcting data inconsistencies in one or more databases and/or data repositories.

BACKGROUND

During the operational use of software, database inconsistencies may result from program errors (e.g., database software errors), computer outages, and incorrect or incomplete data entries. Further, for networked computers, a data transfer to a database on a networked computer might be disrupted by the network as a result of a network outage, for example. In such an instance, the data transfer may be incomplete, and severe data inconsistencies might occur because related data is spread over various databases.

In accounting and financial software applications, for example, customer details may be stored in a first database table, and corresponding bills or purchase orders may be stored in a second database table. In such instances, the bills or purchase orders in the second database table may be associated with customers having their contact information stored in the first database table. Due to a system failure, data of a certain customer may be deleted from the first database, while a purchase order related to that customer may exist in the second database. Such a data inconsistency may only become evident at the time of delivery or shipping of the order, when a recipient cannot be named and associated with the order, since no customer data is available for the recipient.

Once a customer identifies a problem associated with a database inconsistency, the customer may rely on specialized companies to develop software tools for each database inconsistency problem. For example, these software tools may search for a specific kind of inconsistency problem and correct this inconsistency problem in the customer database or databases.

For example, the customer may resolve an identified database inconsistency problem using specialized software obtained through a "pull" approach, i.e., a user detects an inconsistency problem in a database and then checks with a software maintenance provider for available programs to identify and correct the detected inconsistency problem. However, unless the user discovers the problem, no action will be taken and the inconsistency remains, along with its potentially harmful consequences.

Further, in such a pull approach, an individual software tool may need to be designed for each customer. For example, a direct, universal distribution of particular software tool to customers having a similar inconsistency problem may not be possible, since certain types of inconsistencies are interdependent and some corrections might not be performable until another inconsistency is solved. Therefore, such software tools might have to be executed by special experts that are familiar with the interdependencies in order to avoid misuse after having considered the potential impact of a correction to the customer system.

In view of the foregoing, there is a need for improved systems and methods for correcting data inconsistencies within databases and/or data repositories.

SUMMARY

Consistent with embodiments of the present invention, a computer-implemented method is provided for correcting data inconsistencies in databases. The method includes selecting a correction module from a set of correction modules, the selected correction module being associated with a solvable data inconsistency type, and determining whether the selected correction module is associated with an obstacle data inconsistency type. The method also identifies data within one or more databases that includes a data inconsistency of the solvable data inconsistency type. When the selected correction module is unassociated with an obstacle data inconsistency type, or when the identified data not include an inconsistency of the obstacle data inconsistency type, the identified data for the solvable data inconsistency type is corrected using the selected correction module.

Consistent with embodiments of the present invention, a data processing system is also provided for correcting data inconsistencies in databases. The system includes a set of correction modules, wherein each correction module of the set of correction modules is configured to correct a data inconsistency of a solvable data inconsistency type. The system also includes means for selecting a correction module from the set of correction modules, means for determining an obstacle data inconsistency type associated with the selected correction module, and means for identifying data within one or more databases comprising a data inconsistency of the solvable data inconsistency type. Further, the system includes means for correcting the data inconsistency in the identified data using the selected correction module, wherein the selected correction module is configured to correct the identified data when the selected correction module is unassociated with an obstacle data inconsistency type, or when the identified data does not comprise an inconsistency of the obstacle data inconsistency type.

Consistent with embodiments of the present invention, a computer readable medium is provided that includes a set of instructions that, when executed on a processor, perform a method for correcting data inconsistencies in databases. The method selects a correction module from a set of correction modules, the selected correction module being associated with a solvable data inconsistency type. The method also determines whether the selected correction module is associated with an obstacle data inconsistency type and identifies data within one or more databases that includes a data inconsistency of the solvable data inconsistency type. When the selected correction module is unassociated with an obstacle data inconsistency type, or when the identified data not include an inconsistency of the obstacle data inconsistency type, the selected correction module corrects the identified data for the solvable data inconsistency type.

It is to be understood that both the foregoing general description and the following detailed description are exemplary and explanatory only, and are not restrictive of the invention. Further, the accompanying drawings, which are incorporated in and constitute a part of this specification, illustrate embodiments of the invention and together with the description, serve to explain principles of the invention.

DESCRIPTION OF THE EMBODIMENTS

Reference will now be made in detail to embodiments of the invention, examples of which are illustrated in the accompanying drawings. The same reference numbers will be used throughout the drawings to refer to the same or like parts.

Figure 1:
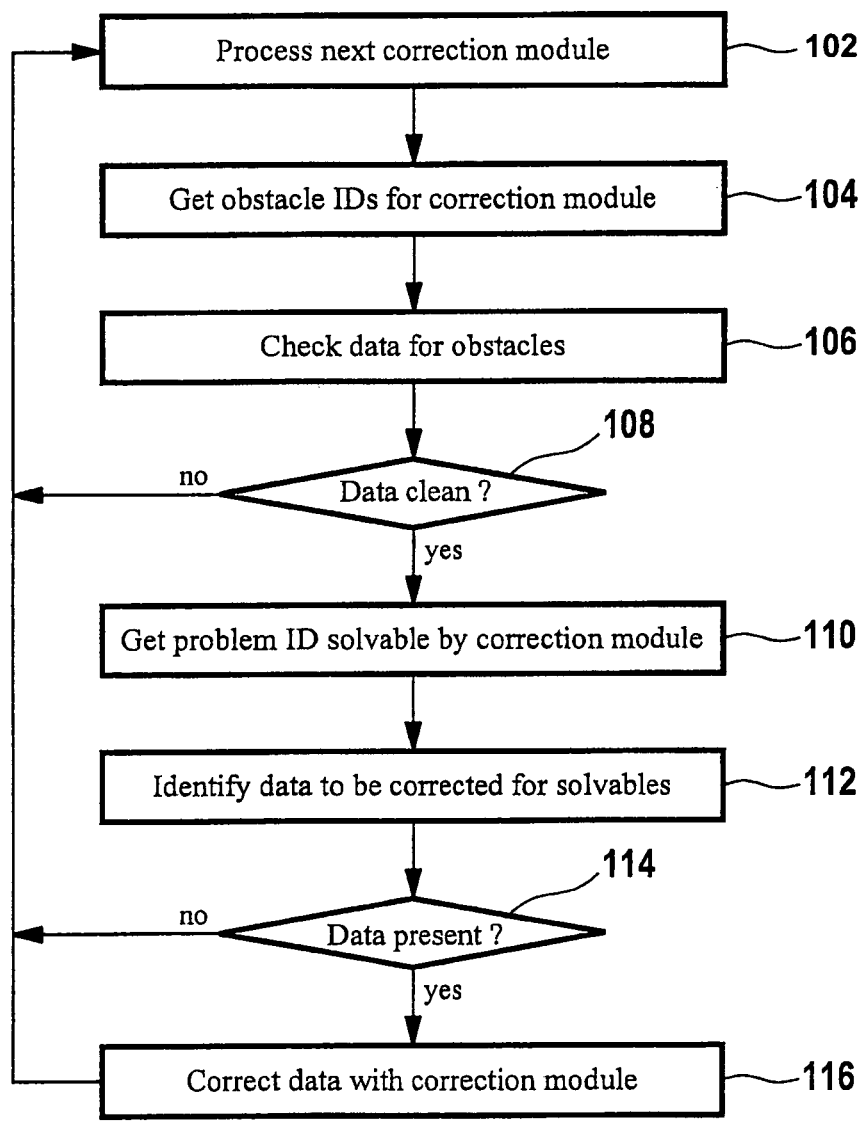
FIGS. 1, 2*a*, and 2*b* are flowcharts of exemplary methods for correcting data inconsistencies in a database, according to embodiments of the present invention.

FIG. 1 illustrates an exemplary method 100 for correcting data inconsistencies in a database, according to an embodiment of the present invention. In step 102, a software framework processes a correction module. In an embodiment, a correction module is a module configured to correct data in one or more databases or data repositories for a specific kind of inconsistency problem. Further, in an embodiment, step 102 can select the correction module from a number of correction modules, for example, in a random manner.

After the correction module has been addressed by the software framework in step 102, step 104 identifies one or more "obstacle identifiers" (e.g., obstacle IDs) associated with the correction module. In an embodiment, the obstacle identifiers denote specific database inconsistency problems. In such an embodiment, the correction module may not be executed to correct data for a data inconsistency in the event that an inconsistency of a type denoted by one of the obstacle identifiers is present in the data. For example, if an obstacle identifier denotes a first database inconsistency, and the first database inconsistency is present in the data, then the correction module may not be executed in order to correct the data for a second kind of database inconsistency.

Step 106 then checks data in a database (or databases) to determine whether any of the obstacles denoted in step 104 are present in the data. If step 106 determines that the database inconsistencies denoted in step 104 are present in the data, step 108 identifies the data as "unclean," and method 100 passes back to step 102, which selects and processes an additional correction module.

However, if step 106 determines that the data is free of the database inconsistencies denoted in step 104, then step 108 identifies the data as "clean." Step 110 then returns a problem identifier (e.g., problem ID) from the selected correction module. In an embodiment, step 110 can, for example, process the correction module to identify a type of database inconsistency associated with the problem identifier, i.e., the type of data inconsistency solvable by the correction module.

Step 112 then identifies data in the database that is subject to the inconsistency problem associated with the problem identifier. If step 114 determines that no data inconsistencies are present in the database, then method 100 passes back to step 102, which selects a different correction module for processing.

However, if step 114 determines that data is present that reveals an inconsistency of the type denoted by the problem identifier, step 116 then performs a database correction using the correction module. Once the identified data inconsistency (or inconsistencies) is corrected by the correction module in step 116, method 100 passes back to step 102, which selects an additional correction module for processing. In an embodiment, the steps of exemplary method 100 may be repeated for each of a number of correction modules.

In an embodiment, one or more of the steps of method 100 may be executed manually by, for example, an operator of a database system or any other user. However, in additional or alternate embodiments, one or more of the steps of method 100 may be performed on a regular basis in an automatic manner. For example, method 100 may be automatically performed on a particular database (or databases) after a certain time interval. Furthermore, in additional embodiments, one or more of the steps of method 100 may be performed once a particular database (or databases) is idle or subject to a low workload. In such an embodiment, a low workload for a database system may be defined as a workload that falls below a predetermined threshold value, which may be manually established or automatically determined.

Figure 2A:
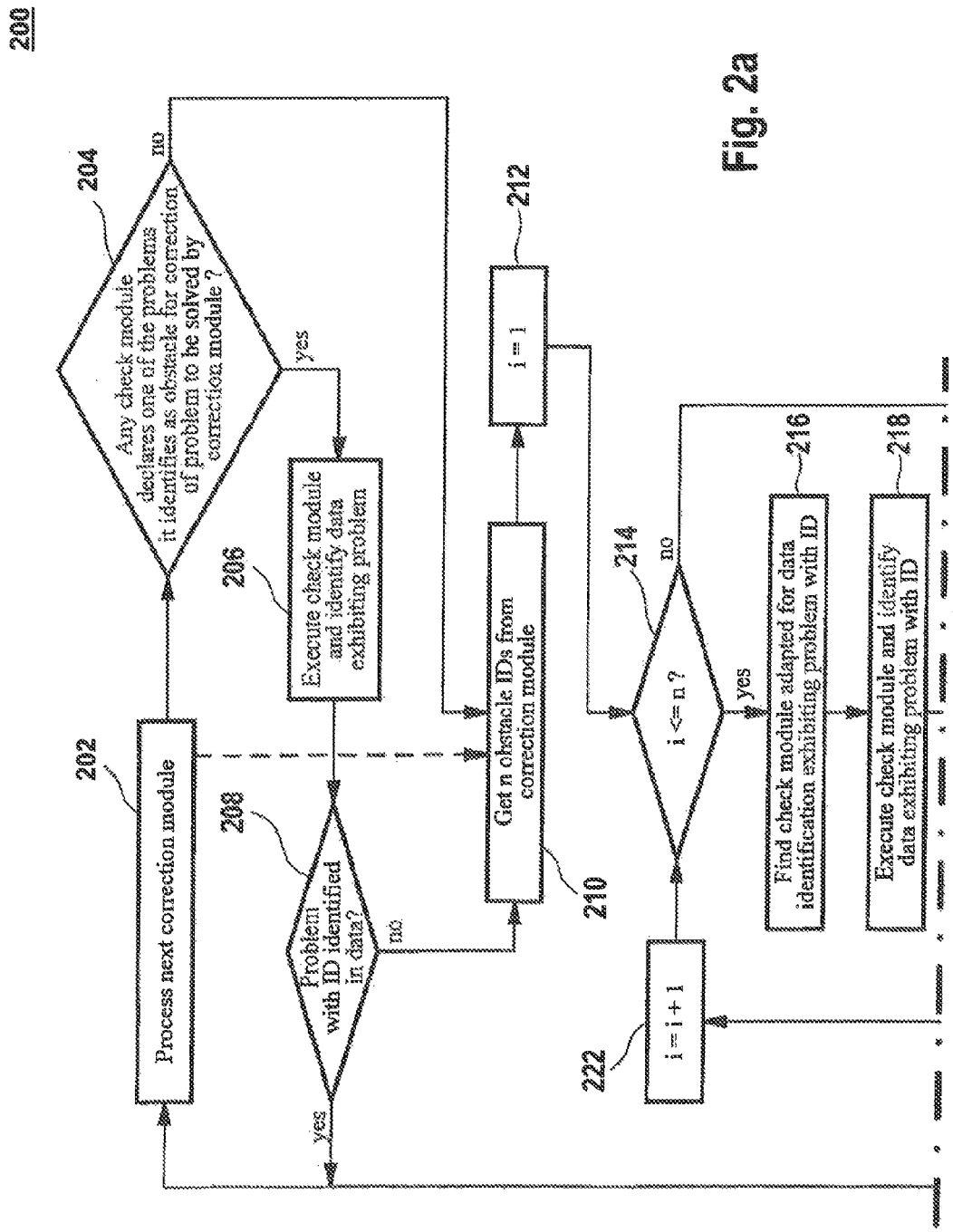
Figure 2B:
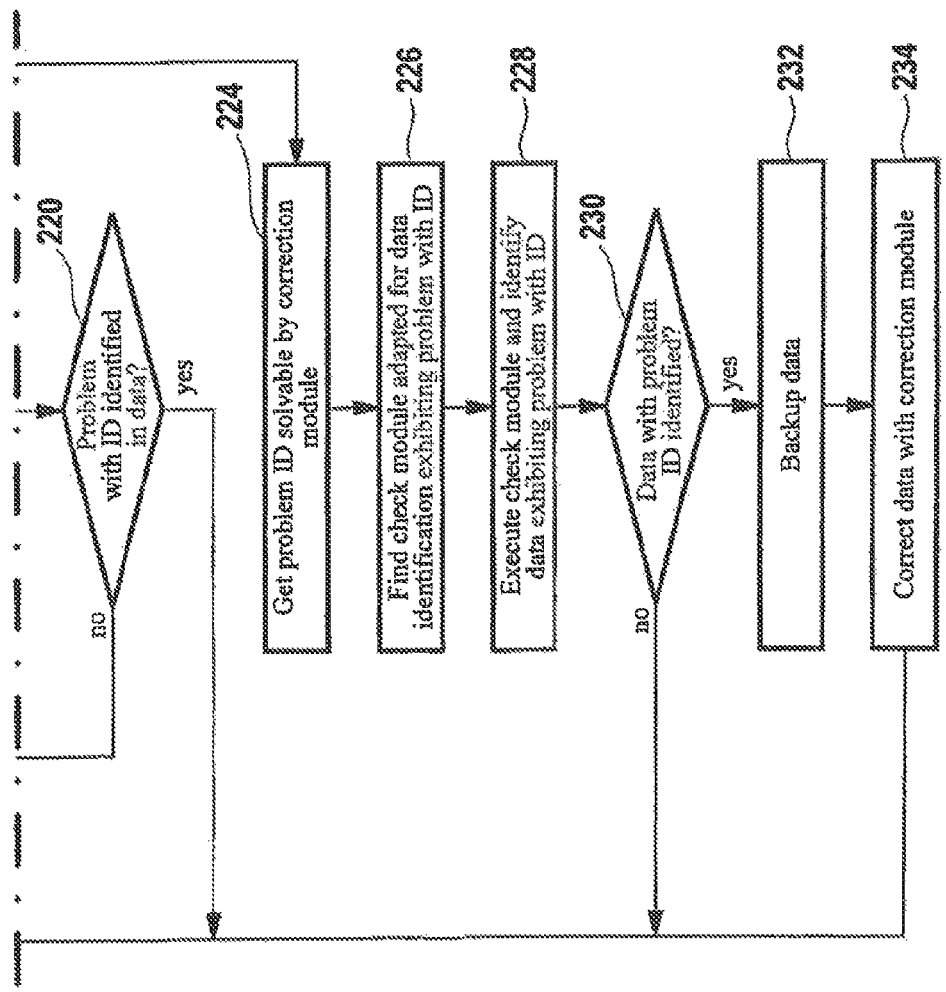

FIGS. 2a and 2b illustrate an exemplary method 200 for correcting data inconsistencies within a database system, according to an embodiment of the present invention. In step 202, a correction module is selected for processing by a software framework. In an embodiment, step 202 may be similar to step 102 of FIG. 1. For example, step 202 can select the correction module from a number of correction modules in a random fashion. However, in additional embodiments, step 202 can select the correction module from any number of correction modules in manually, or in any additional or alternate manner, without departing from the spirit or scope of the present invention.

In an embodiment, the selected module passes from step 202 to step 210 along the dashed arrow, thus bypassing intermediate steps 204, 206, and 208. In an embodiment, step 210 may correspond to step 104, as described above in reference to FIG. 1.

In step 210, one or more obstacle identifiers are obtained from the selected correction module. In an embodiment, the obstacle identifier may denote a type of data inconsistency problem that, if present in the data, acts as an obstacle to an execution of the selected correction module on the data. Further, in an embodiment, step 210 obtains a number n of obstacle identifiers (e.g., obstacle IDs) from the selected correction module. Step 212 then sets a counter i, which is representative of a particular obstacle identifier obtained from step 210, to unity.

Step 214 then tests whether counter i is less than or equal to n (i.e., i≤n). If step 214 determines that i is less than or equal to n, then step 216 searches each of a number of check modules to identify a check module that is associated with a data inconsistency identifier denoted by obstacle identifier i (e.g., a check module whose problem identifier matches obstacle identifier i). In such an embodiment, each obstacle identifier i is associated with at least one check module, which itself may be configured to identify a data inconsistency problem. Step 218 then executes the identified check module in order to identify possible data in a database (or databases) that includes inconsistencies exhibiting a problem associated obstacle identifier i.

Step 220 then determines whether step 218 has identified any data, within the database that exhibits the problem associated with obstacle identifier i. If step 220 determines that such data was identified by step 218, then the identified data represents an obstacle for the execution of the selected correction module, e.g., the selected correction module cannot be executed on the identified data. Therefore, method 200 passes back to step 202, which selects an additional correction module for processing.

In contrast, if step 220 determines that no data in the database exhibits the problem, then step 222 increments counter i by one, and method 200 passes back to step 214, which determines if counter i is less than or equal to n. In such a fashion, exemplary method 200 loops over each of the obstacle identifiers identified in step 210.

If, however, step 214 determines that counter i is not smaller or equal to n, then method 200 passes forward from step 214 to step 224. In an embodiment, such a scenario could occur when the selected correction module is associated with no obstacles, e.g., the number of obstacle identifiers n is zero. However, in additional or alternate embodiments, such a scenario may occur when, in executing steps 214 through 222, no data was identified that exhibits the obstacle inconsistencies denoted by the selected correction module.

In such embodiments, method 200 passes directly from step 214 to step 224 (which may correspond to step 110 of FIG. 1). In step 224, the problem identifier (e.g., problem ID) is obtained from the selected correction module, as described above. In an embodiment, the problem identifier may denote a type of data inconsistency problem that, if present in the data, may be corrected by the selected correction module.

Method 200 then identifies data in the database or databases subject to the inconsistency type denoted by the problem identifier of step 224. In an embodiment, the data identification step may correspond to step 112 of FIG. 1. Further, and as described above in reference to obstacle identifiers, the data identification may be performed using a separate module, addressed by the software framework as a check module. In such an embodiment, each problem identifier is associated with at least one check module, which itself may be configured to identify data having the database inconsistency problem denoted by the problem identifier.

However, in additional embodiments, both the correction modules and the check modules are provided independently to the database system. As such, it may not be possible to directly address a check module by means of the problem identifier. Therefore, in step 226, each of a number of check modules is searched in order to find a check module that is configured to identify a data inconsistency of a type denoted by the problem identifier of the correction module. The identified check module is then executed in step 228 to identify data in the database or databases that includes inconsistencies associated with the problem identifier of step 224.

If step 230 determines that data was identified in step 228, the identified data may be backed up in step 232 to ensure that the data may be restored in an event that the data is damaged during the data correction process. Step 234 then executes the selected correction module (as selected in step 202) to correct the data inconsistency present within the identified data, after which method 200 passes back to step 202, which selects an additional correction module for processing. As described above, exemplary method 200 may correct data in one or more databases for a data inconsistency solvable by a number of correction modules.

However, the identified data need not be backed up prior to processing in step 234. In an additional or alternate embodiment, the data identified in step 228 may be processed directed by step 234 without any intervening step that backs up or stores the identified data.

However, if step 230 determines that no data was identified by step 228, then the indentified data includes no data inconsistencies of the type denoted by the problem identifier of the selected correction module. In such an embodiment, method 200 passes from step 230 back to step 202, which selects an additional correction module for processing.

In the embodiment described above, the selected correction model is passed directly from step 202 to step 210, which identifies obstacle identifiers associated with the correction module, without any intermediate processing. However, in an additional or alternate embodiment, intermediate steps 204 through 208 may process the selected correction module before obtaining obstacle identifiers associated with the selected correction module in step 210.

In an embodiment, intermediate processing steps 204 through 208 collectively address an instance in which a correction module has been delivered to a user before a delivery of a check module. In such an instance, and after the development of the check module, an execution of the correction module for correcting for a certain type of inconsistency may not be performed properly before resolving an inconsistency detected by the new check module.

In such an instance, when the correction module has already been delivered to the user, an exemplary solution associates each newly-delivered check module with one or more corresponding "obstacle associations." For example, an obstacle association provided by a check module indicates that the correction module associated with the obstacle association may not be executed before resolving a possible inconsistency problem detectable by the check module. In an embodiment, steps 204 through 208 describe an exemplary process for testing check modules for obstacle associations.

Once a correction module is selected in step 202, step 204 may determine if any check module declares, as an obstacle association, one or more of the problems identified as an obstacle for correcting the problem solvable by the selected correction module. In an embodiment, each check module may include a conflict list that tabulates obstacle associations, which, for example, correspond to a list of types of inconsistencies potentially solved by one or more correction modules.

If step 204 determines that no obstacle association of a check module corresponds with a problem identifier solvable by the selected correction module, then the selected module is passed directed from step 204 to step 210, which obtains obstacle identifiers associated with the selected correction module, as described above.

However, if step 204 determines that an obstacle association of a check module corresponds with a problem identifier solvable by the selected correction module, then step 206 executes the check module to identify data in a database (or databases) that potentially exhibit the problem denoted by the check module. Subsequently, if step 208 determines that step 206 has identified data that exhibits the inconsistency type denoted by the check module, method 200 passes back to step 202, which selects a new correction module. In such an embodiment, the identified data exhibits an inconsistency of a new type, and the selected correction module, when applied to this data, would be unable to properly perform a data inconsistency correction. Therefore, in such an embodiment, it may be advantageous to first solve this problem in order to ensure that future data corrections may be performed with the selected correction module in a proper and safe manner.

However, if step 208 determines that no data exhibiting the data inconsistency type has been identified in step 206, then no check module includes an obstacle association with the selected correction module. In such an instance, the selected correction module is passed to step 210 and through the remaining processing steps, as described above. In such an embodiment, no data is present in the database that exhibits the inconsistency problem associated with the check module detected in step 204.

Figure 3:
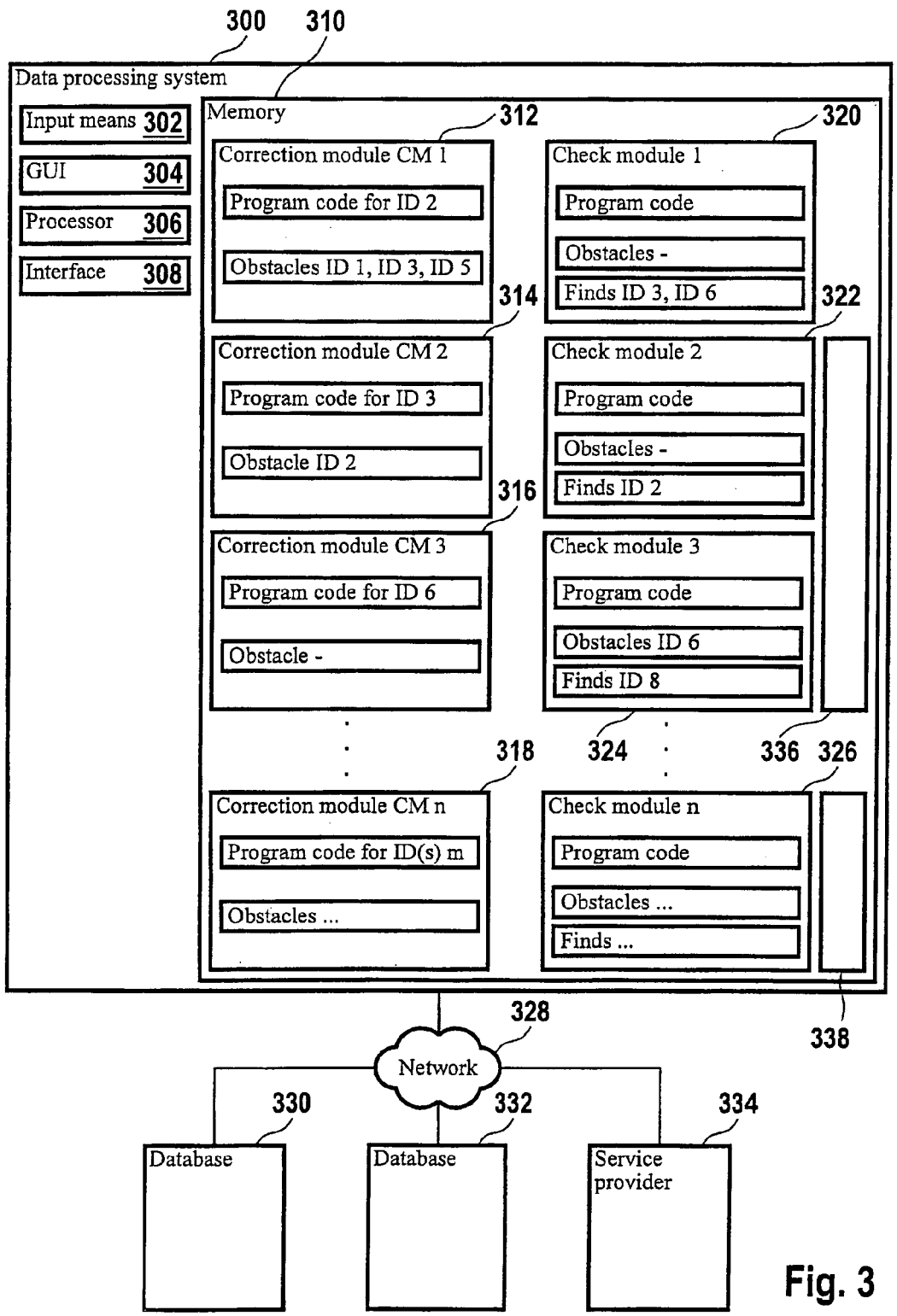
FIG. 3 illustrates an exemplary data processing system, according to an embodiment of the present invention.

FIG. 3 is a block diagram of a data processing system 300, according to an embodiment of the present invention. Data processing system 300 includes an input means 302, including, but not limited to, a keyboard, mouse, any haptic input means, or any additional or alternate input means apparent to one skilled in the art. Data processing system 300 also includes a graphical user interface 304, including, but not limited to, a computer screen and any additional or alternate interface known to one of skill in the art.

As shown in FIG. 3, data processing system 300 also includes a processor 306, which is capable of executing computer executable instructions stored in a memory 310. Further, data processing system 300 includes an interface 308 by which data processing system 300 is able to communicate via a network 328 with databases 330 and 332 and, for example, a service provider 334. For example, the network 328 is a wireless telecommunication network, or a wired network, such as the Internet or an intranet.

In an embodiment, memory 310 may include, but is not limited to, a hard disk drive, a removable storage drive (e.g., a magnetic tape drive, an optical disk drive, an CD/DVD drive), and/or a removable memory chip (e.g., EPROM, RAM, ROM, DRAM, EEPROM, flash memory devices, or other volatile or non-volatile memory devices) and associated socket. In an embodiment, the removable storage drive may read from and/or writes to a removable storage unit in a well-known manner. Removable storage unit may represents a magnetic tape, optical disk, or other storage medium that is read by and written to by removable storage drive. As will be appreciated, memory 310 may represent a computer readable medium having stored therein computer programs, sets of computer-executable instructions, code, or data.

In an embodiment, memory 310 includes various modules. Each modules may include computer executable instructions, which may be executed by processor 306.

Further, memory 310 includes a data buffer 336, which loads data from databases 330 and 332 into data processing system 300. Databases 330 and 332 may be, for example, relational databases, in which database 330 includes a first set of data and database 332 includes a second set of data. In such a configuration, the first set of data and the second set of data may depend on each other. However, in additional embodiments, dependent sets of data, e.g., the first and second data sets, may be stored in different tables of the same relational database.

In an embodiment, data processing system 300 ensures consistency between the first set of data in the database 330 and the second set of data in the database 332. In such an instance, the first and second set of data is loaded via the network 328 into the buffer 336, and a check for data inconsistencies may be performed on the buffered data.

In an embodiment, a check for data consistency may be performed by means of a software framework module 338, which controls an addressing of one or more correction modules and one or more check modules. In an embodiment, the correction and check modules, shown respectively at 312 through 318 and 320 through 326, may be provided to data processing system 300 by a service provider 334. Further, software framework 338 may be provided to a user with an installation of data processing system 300.

Simultaneously with the discovery of various data inconsistency types for databases 330 and 332, and additionally or alternatively, any other databases of other customers not depicted in FIG. 3, various correction and check modules may be developed by the service provider 334. In an embodiment, the correction and check modules developed by service provider 334 may be provided to data processing system 300 by means of a push approach.

In the exemplary embodiment of FIG. 3, memory 310 of data processing system 300 includes a set of correction modules CM1 312, CM2 314, and CM3 316, as well as any number of additional correction modules CM n shown generally at 318. Further, in the embodiment of FIG. 3, memory 310 includes a first check module 320, a second check module 322, a third check module 324, and any number of additional check modules n, shown generally at 326.

Each correction module may include program code that is executable by processor 306. For example, first correction module CM1 312 may include program code that enables the correction module to correct for database inconsistencies of type 2, i.e. the first correction module includes program code for a database inconsistency with an identifier 2. Similarly, the second correction module CM2 314 is capable of correcting for database inconsistencies of a type 3, whereas the third correction module CM3 316 is capable of correcting for database inconsistencies of type 6.

Further, each correction module may or may not include identifiers of obstacle inconsistencies, denoted by obstacles identifiers (e.g., obstacle IDs) corresponding to a problem identifier (e.g., problem ID) related to a specific type of inconsistency. In an event that a correction module includes an obstacle identifier, the corresponding correction module should not be executed to correct for a certain data inconsistency, if a further data inconsistency of the type denoted by the obstacle identifier is present in the database. In such an instance, this obstacle inconsistency should be resolved before the correction module is executed, as described above in reference to steps 204 through 208 of FIG. 2a.

In an embodiment, check modules 320 through 326 in memory 310 include program code that enable each check module to detect a certain data inconsistency denoted by its inconsistency identifier. For example, first check module 320 may be configured to find inconsistencies of type 3 and 6. Further, for example, second check module 322 may be configured to find inconsistencies of type 2, whereas third check module 324 may be configured to find inconsistencies of type 8.

Additionally, the check modules may or may not be associated with obstacle associations. For example, third check module 324 includes an obstacle association ID of 6, which denotes that a correction module configured to solve the inconsistency problem of type 6 should not be executed directly on data in buffer 338 if that data includes an inconsistency of type 6. In such an instance, an inconsistency of type "identifier 8" should be resolved before executing a correction module configured to solve a problem of type 6 (e.g., correction module 316 of FIG. 3).

In an exemplary embodiment, data processing system 300 may randomly select a correction module, such as third correction module 316, to correct data inconsistencies within a data set. However, in additional or alternate embodiments, data processing system 300 can select first correction module 312, second correction module 314, or any additional correction module, randomly or otherwise, without departing from the spirit or scope of the present invention. As depicted in FIG. 3, first correction module 316 can correct for data inconsistencies of type 6. As such, in the exemplary embodiment, framework 338 randomly calls each of check modules 320 through 326, starting from an arbitrary check module number, in order to find the appropriate check module that can check for the presence of a data inconsistency of type 6. Such an exemplary process would return the module identifier "check module 1" corresponding to first check module 320.

However, as discussed above, a possibility exists that third correction module 316 was delivered before the development of a new check module, which, in an embodiment, could find a possible inconsistency problem whose presence in the data of buffer 336 would cause a conflict if third correction module 316 were executed before the problem were resolved. For example, such an instance occurs in the case of third check module 324. Third check module 324 indicates an obstacle association with the problem identifier 6 (which is associated with third correction module 316), such that unless a problem denoted by identifier 8 is identified by third check module 324, third correction module 316 would not be executed.

In such an instance, third correction module 316 would not be executed, and framework 338 would randomly select a further or subsequent correction module from correction modules 312 through 318 stored in memory 310. For example, framework 338 could randomly select second correction module CM2 314. In such an exemplary embodiment, second correction module 314 is able to correct for data inconsistencies of type 3. However, an obstacle identifier (ID) of 2 associated with second correction module 314 indicates that second correction module 314 can only be executed if no inconsistency problem of type 2 were present in the data stored in the buffer 336. Further, and as described above, framework 338 then processes check modules 320 through 326 to find a check module that is able to identify a data inconsistency of type 2.

In the exemplary embodiment, framework 338 would determine that second check module 322 is able to perform a check on a data inconsistency of type 2 on the data stored in the buffer 336. Therefore, if the data stored in buffer 336 shows no inconsistency of type 2, framework 338 continues executing second correction module 314. Furthermore, framework 338 also determines whether a check module is present in system 300 that has an obstacle association with an identifier 3, i.e., the identifier can be corrected by second correction module 314. However, since this is not the case, the correction module CM2 can be executed by framework 338.

Moreover, in the exemplary embodiment, system 300 needs to identify data within buffer 336 that shows inconsistencies of the type 3 solvable by second correction module 314. In an embodiment, framework 338 again scans check modules 320 through 326 in order to find a check module configured to identify data having inconsistencies of the type 3. As such, framework 338 would find that first check module 320 is capable of identifying such data. Framework 338 would then execute first check module 320 and return the identified data to second correction module 314, which corrects the identified data for inconsistencies of type 3.

Further, in an embodiment, framework 338 also backs up the identified data prior to correction. Such a data backup enables framework 338 to cancel a correction of the data in case the correction performed by the correction module, e.g., second correction module 314 of the exemplary embodiment, damages the identified data.

Figure 4:
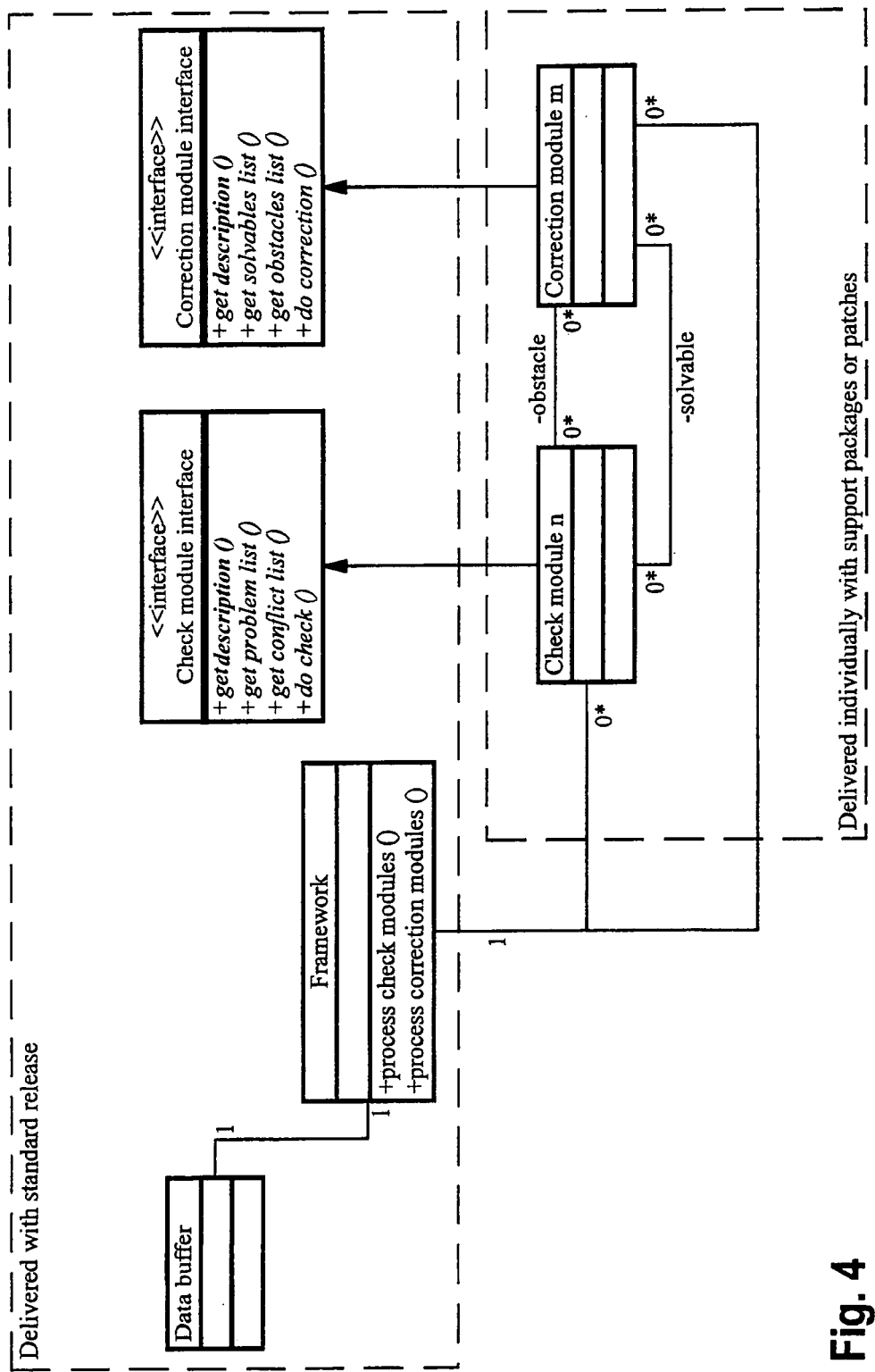
FIG. 4 is a unified modeling language (UML) diagram illustrating an exemplary architecture of a data processing system, according to an embodiment of the present invention.

FIG. 4 is a unified modeling language (UML) diagram illustrating an exemplary architecture of a data processing system (e.g., data processing system 300 of FIG. 3) using an object-oriented approach, according to an embodiment of the present invention. In the embodiment of FIG. 4, a framework class addressed by a software framework ("framework") may handle an administration of module instances as well as a coordination of any process flow. Further, in an embodiment, the framework class may not directly address module instances "check module" and "correction module." In such an embodiment, the framework class may address the "check module" and "correction module" instances, respectively, through corresponding interfaces "check module interface" and "correction module interface." In such an embodiment, the "check module interface" and "correction module interface" may, respectively, include one or more check modules and one or more correction modules, such as those described above in reference to FIG. 3.

In an embodiment, a check module includes a class that implements the check module interface and that obeys the naming convention of the check modules. In such an embodiment, the usage of the naming convention has the advantage, i.e., the framework can easily identify new correction and check modules, which renders the framework upgradeable with new modules without a need for a modification of the framework. The check module interface includes a method that returns a description of the type of inconsistency identified by a corresponding check of data and a method that returns a list of all problems identified by the check and their corresponding description. In such an embodiment, a "problem" represents a sub-category within the check, and a problem identifier may be used by a correction module to define those problems that are solvable by the correction module and those problems that act as an obstacle to the execution of the correction module. Further, the check module interface includes a method that declares which problems identified by the check module act as obstacles for correction modules solving the particular problem (e.g., a conflict list or one or more "obstacle associations," as described above). As described above, such a method may be implemented if the correction module has been delivered to a customer or user before the check module was delivered to that customer or user.

Further, the check module interface includes a method that executes the check on data in the data buffer. An exemplary implementation of such a method includes loading relevant data from the buffer, performing a consistency check, and buffering the result.

In an embodiment, a correction module may include of a class that implements the correction module interface and that obeys the naming convention for the correction modules. The correction module interface may also include a method that returns a textual description the correction module. Further, the correction module interface may include a method that returns a list of solvable problems identified by a problem identifier of the correction module. In an embodiment, the correction module interface may also include a method that returns a list of obstacles identified by the problem identifier. Further, the correction module interface may include a method that implements the correction on the data in the buffer.

In an embodiment, data to be analyzed may be buffered in a runtime memory using the class "data buffer" after being read from a database. Furthermore, the check and correction modules may be represented, respectively, by classes "check module n" and "correction module n", where n is an identifier for a specific module. These classes may implement, respectively, the check module interface and the correction module interface described above.

In the embodiment of FIG. 4, the check and correction module classes may be loosely related via two relations: "solvable" and "obstacle." A "solvable" relation indicates that a correction module is able to repair inconsistencies detected by a specific check module. An "obstacle" relation indicates that inconsistencies identified by a check module are an obstacle for the execution of a correction module, i.e., that the correction module will not be executed as long as these inconsistencies are not repaired by any other correction module.

In an embodiment, neither relation is direct, i.e., the modules do not refer directly to each other, but they use problem identifiers defining the types of inconsistencies, identified by check modules or repaired by correction modules. The framework class will then establish the relations using the problem IDs provided by the modules through the methods "get_problem_list()" and "get_conflict_list()" of the check module interface, as well as "get_solvables_list()" and "get_obstacles_list()" of the correction module interface.

In an embodiment, the classes data buffer, framework, and the two interfaces may be part of the initial shipment with a regular or standard release. The modules can then be delivered individually or collectively with support packages or patches as soon as new inconsistencies are identified.

Figure 5:
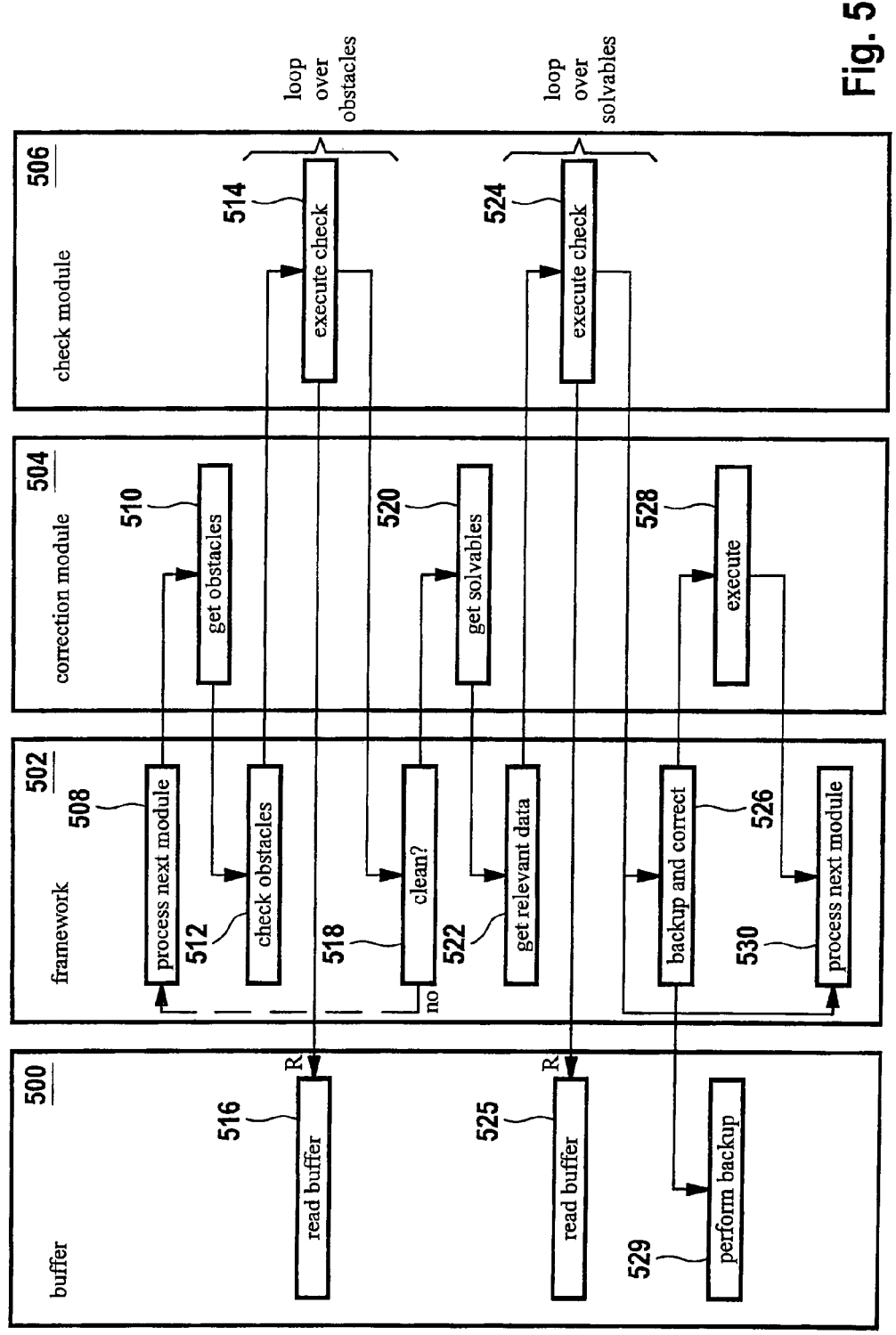
FIG. 5 is a process flow of an exemplary method for correcting inconsistencies in a database, according to an embodiment of the present invention.

FIG. 5 illustrates an exemplary process flow that incorporates a document buffer 500, a framework 502, a correction module 504, and a check module 506, according to an embodiment of the present invention. By way of example, buffer 500 may include, but is not limited to, a read buffer. Further, framework 502 may correspond to software framework 338 described above in reference to FIG. 3. Correction module 504 may represent any one of correction modules 312 through 318 described above in reference to FIG. 3, and check module 506 may represent any one of check modules 320 through 326, as described above in reference to FIG. 3.

In step 508, framework 502 initiates the process flow by processing a correction module, e.g., correction module 504. Step 510 then identifies one or more obstacles associated with correction module 504 and provides these identified obstacles to framework 502. In an embodiment, such obstacles include, but are not limited to, problem identifiers that would prevent the execution of correction module 504 on data within buffer 500.

Step 512 identifies an appropriate check module to find the identified obstacle, e.g., check module 506, and in step 514, instructs check module 506 to perform a check for the identified obstacles within data of buffer 500. In an embodiment, check module 506 may not directly access buffer 500, but instead may call framework 502, which accesses buffer 501 in step 516. Furthermore, as step 510 may identify a plurality of obstacles, steps 512 and 514 loop over each identified obstacle to determine whether each of the identified obstacles is present in the accessed data.

In step 518, framework 502 determines whether the accessed data is free from the obstacles associated with correction module 504, i.e., whether the data is clean. If the data read from buffer 501 in step 516 is clean, then process flow 500 passes to step 520. However, if the data read from buffer 501 is unclean, then process flow 500 passes back to step 508, in which framework 502 calls a subsequent correction module 504.

In an embodiment, and as described above, if the data were clean and free from obstacles, correction module 506 returns in step 520 a list of solvable problem identifiers ("solvables") to framework 502. Framework 502 then calls check module 506 in step 522 in order to obtain one or more inconsistencies correctable by means of the solvables obtained in step 520. In step 524, check module 506 then executes the check on data in buffer 500 and calls framework 502, which manages access to the buffer in step 525. Furthermore, as step 512 may return a number of solvables, step 524 may loop over each returned solvable to determine whether each of the returned solvables is present in the accessed data.

In the event that the data read accessed from buffer 500 includes one or more inconsistencies, framework 502 then backs up the identified data in step 526, for example, by writing the identified data in step 529 to a cluster or other storage device associated with buffer 500. In an embodiment, this cluster can be either an internal or external database. In an additional embodiment, the storage device can be random access memory (RAM) of a data processing system that runs framework 502, and additional storage device associated with the data processing system (e.g., any storage device described above in reference to memory 310 of FIG. 3), or any additional storage device apparent to one skilled in the art.

Further, in step 526, framework 502 also calls correction module 504, which executes a method in step 528 that corrects the data identified by the check module in step 524. Once correction module 504 corrects the identified data, process flow 500 passes to step 530, in which framework 502 identifies and processes a new correction module.

However, if the accessed data includes no inconsistencies, process flow 524 passes directly from step 524 to step 530, in which, as described above, framework 502 identifies and processes a new correction module.

In an embodiment, the steps of the process flow, as executed by buffer 501, framework 502, correction module 504, and check module 506, correspond to similar steps of method 200 of FIGS. 2a and 2b. In such an embodiment, the process flow may corresponds to method 200 without intermediate processing steps 204 through 208, i.e., the embodiment of method 200 in which the correction module identified in step 202 passes directly to step 210.

In an embodiment, once a framework has been implemented in a data processing system accessing a database, e.g., framework 338 of data processing system 300 of FIG. 3, individual correction modules may be provided to the system and may be automatically recognized by the framework without additional user action. For example, additional correction modules may be delivered to the data processing system as support packages or batches. Further, by regularly or automatically delivering such new correction modules, data may be corrected for data inconsistencies in a reliable manner.

Furthermore, since the above-described embodiments feature an iterative approach, an order in which the correction modules are selected may be arbitrary. As such, the development and provision of new correction modules may be completely independent for different development and provision sources. Developers and companies can provide new correction modules independently of each other, without the requirement of considering a particular order in which the modules are processed in the customer system.

In a similar fashion, the development of check modules can be made independently for different developers without considering a special delivery order at which new check modules are provided to a customer. Further, check modules can be developed completely independently of correction modules.

For example, the exemplary methods and system described above may utilize batch processing to correct data for data inconsistencies. In an embodiment, a data processing system, e.g., data processing system 300 of FIG. 3, may be provided with updated check modules and correction modules, for example, via support packages or patches using a "push" approach. As soon as a new check and/or correction module is available, the new module may be provided and used by all customers in a distributed manner, without specific actions from their side. In an embodiment, a software framework may be implemented once in the customer data processing system, for example, via an initial software release. Modules delivered via support packages or batches will be automatically recognized by the framework, without any further user interactions.

In the embodiments described above, a user interaction is not required to execute the exemplary methods and systems. For example, the database inconsistency checks may be performed on a regular basis, i.e., every night when the system load is minimized, or every weekend, or in manner, random or otherwise, without departing from the spirit or scope of the present invention. However, in an embodiment, the above-described systems and methods may also be initiated manually by, for example, a user or an operator.

The foregoing description has been presented for purposes of illustration. It is not exhaustive and is not limiting to the precise forms or embodiments disclosed. Modifications and adaptations will be apparent to those skilled in the art from consideration of the specification and practice of the disclosed embodiments. For example, the described implementations include software, but systems and methods consistent with the disclosed embodiments may be implemented as any combination of hardware and software or in hardware alone. Examples of hardware include computing or processing systems, including personal computers, servers, laptops, mainframes, micro-processors and the like. Additionally, although aspects are described for being stored in memory, one skilled in the art will appreciate that these aspects can also be stored on other types of computer-readable media, such as secondary storage devices, for example, hard disks, floppy disks, or CD-ROM, or other forms of RAM or ROM.

Computer programs based on the written description and methods are within the skill of an experienced developer. The various programs or program modules can be created using any of the techniques known to one skilled in the art or can be designed in connection with existing software. For example, program sections or program modules can be designed in or by means of Java, C++, HTML, XML, or HTML with included Java applets. One or more of such software sections or modules can be integrated into a computer system or existing e-mail or browser software.

Moreover, while illustrative embodiments have been described herein, the scope of thereof includes any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. Further, the steps of the disclosed methods may be modified in any manner, including by reordering steps and/or inserting or deleting steps. It is intended, therefore, that the specification and examples be considered as exemplary only, with a true scope and spirit being indicated by the following claims and their full scope of equivalents.

What is claimed is:

1. A computer-implemented method for correcting data inconsistencies in databases, comprising:
   obtaining a first correction module associated with a first type of data inconsistency and a second type of data inconsistency;
   identifying data within one or more of the databases that includes a first data inconsistency of the first type,
      the first inconsistency being correctable by the first correction module;
   determining whether the identified data includes a second data inconsistency of the second type, the second data inconsistency preventing correction of the first data inconsistency by the first correction module; and
   when the identified data fails to include the second data inconsistency, correcting, using at least one processor, the identified data for the first data inconsistency using the first correction module.

2. The method of claim 1, wherein the identifying comprises:
   selecting a first check module from a set of check modules, the first check module being associated with a third type of data inconsistency; and
   determining whether the third type of data inconsistency matches the first type of data inconsistency.

3. The method of claim 2, wherein the identifying further comprises:
   identifying the data including the first data inconsistency using the first check module, when the third type of data inconsistency matches the first type of data inconsistency; and
   selecting a second check module from the set of check modules, when the third type of data inconsistency fails to match the first type of data inconsistency.

4. The method of claim 1, wherein the correcting comprises:
   selecting a first check module from a set of check modules, the first check module being associated with a third type of data inconsistency; and
   determining whether the third type of data inconsistency matches the second type of data inconsistency.

5. The method of claim 4, wherein the correcting further comprises:
   identifying the second data inconsistency using the first check module, when the third type of data inconsistency matches the second type of data inconsistency; and
   selecting a second check module from the set of check modules, when the third type of data inconsistency fails to match the second type of data inconsistency.

6. The method of claim 1, wherein the correcting comprises:
   selecting a first check module from a set of check modules;
   determining whether the first check module includes an obstacle association with the first type of data inconsistency.

7. The method of claim 6, wherein the correcting further comprises:
   correcting the identified data for the first data inconsistency using the first correction module, when the first check module fails to includes the obstacle association, or when the first check module is associated with the obstacle association and the identified data fails to include the second data inconsistency.

8. The method of claim 1, wherein the obtaining comprises receiving the correction module.

9. The method of claim 1, wherein at least one of the steps of selecting, obtaining, or correcting are executed automatically when a database workload falls below a predetermined threshold.

10. The method of claim 1, wherein at least one of the steps of selecting, obtaining, or correcting are performed by batch processing.

11. The method of claim 1, wherein:
    the identifying comprises storing the data into a data buffer; and
    the correcting comprises identifying the first data inconsistency in the data by accessing the data stored in the data buffer.

12. The method of claim 1, further comprising repeating the steps of selecting, obtaining, identifying, and correcting until all data inconsistencies in the data have been corrected.

13. A data processing system for correcting data inconsistencies in databases, comprising:
    a storage device; and
    at least one processor coupled to the storage device, the storage device storing a program for controlling the at least one processor, and wherein the at least one processor, being operative with the program, is configured to:
obtain a first correction module associated with a first type of data inconsistency and a second of data inconsistency;
identify data within one or more of the databases comprising a first data inconsistency of the first type, the first data inconsistency being correctable by the first correctional module;
determine whether the identified data includes a second data inconsistency of the second type, the second data inconsistency preventing correction of the first data inconsistency by the first correction module; and
when the identified data fails to include the second data inconsistency, correct the first data inconsistency in the identified data using the first correction module.

14. The system of claim 13, wherein:
the storage device stores a set of check modules; and
the at least one processor is further configured to:
select a first check module from the set of check modules, the first check module being associated with a third type of data inconsistency; and
determine whether the third type of data inconsistency matches the first type of data inconsistency.

15. The system of claim 14, wherein the at least one processor is further configured to:
identify the data comprising the first data inconsistency using the first check module, when the third type of data inconsistency matches the first type of data inconsistency; and
select a second check module from the set of check modules, when the third type of data inconsistency fails to match the first type of data inconsistency.

16. The system of claim 13, wherein:
the storage device stores a set of check modules; and
the at least one processor is further configured to:
select a first check module from the set of check modules, the first check module being associated with a third type of data inconsistency; and
determine whether the third type of data inconsistency type matches the second type of data inconsistency.

17. The system of claim 16, wherein the at least one processor is further configured to:
identify the second data inconsistency within the identified data, when the third type of data inconsistency matches the second type of data inconsistency; and
select a second check module from the set of check modules, when the third type of data inconsistency fails to match the second type of data inconsistency.

18. The system of claim 13, wherein:
the storage device stores a set of check modules; and
the at least one processor is further configured to:
select a first check module from a set of check modules; and
determine whether the selected check module comprises an obstacle association with the first type of data inconsistency.

19. The system of claim 18, wherein the at least one processor is further configured to:
correct the identified data for the first data inconsistency using the first correction module, when the first check module fails to include the obstacle association, or when the first check module includes the obstacle association and the identified data fails to include the second data inconsistency.

20. A tangible, non-transitory computer-readable medium comprising a set of instructions that, when executed on a processor, perform a method for correcting data inconsistencies in databases, the method comprising:
obtaining a first correction module associated with a first type of data inconsistency and a second type of data inconsistency;
identifying data within one or more of the databases that includes a first data inconsistency of the first type, the first data inconsistency being correctable by the first correction module;
determining whether the identified data includes a second data inconsistency of the second type, the second data inconsistency preventing correction of the first data inconsistency by the first correction module; and
when the identified data fails to include the second data inconsistency, correcting the identified data for the first data inconsistency using the first correction module.

21. The computer-readable medium of claim 20, wherein the identifying comprises:
selecting a first check module from a set of check modules, the first check module being associated with a third type of data inconsistency; and
determining whether the third type of data inconsistency matches the first type of data inconsistency.

22. The computer-readable medium of claim 21, wherein the identifying further comprises:
identifying the data including the first data inconsistency using the first check module, when the third type of data inconsistency matches the first type of data inconsistency; and
selecting a second check module from the set of check modules, when the third type of data inconsistency fails to match the first type of data inconsistency.

23. The computer-readable medium of claim 20, wherein the correcting comprises:
selecting a first check module from a set of check modules, the first check module being associated with a third type of data inconsistency; and
determining whether the third type of data inconsistency matches the second type of data inconsistency.

24. The computer-readable medium of claim 23, wherein the correcting further comprises:
identifying the second data inconsistency using the first check module, when the third type of data inconsistency matches the second type of data inconsistency; and
selecting second check module from the set of check modules, when the third type of data inconsistency fails to match the second type of data inconsistency.

25. The computer-readable medium of claim 20, wherein the correcting comprises:
selecting a first check module from a set of check modules;
determining whether the first check module includes an obstacle association with the first type of data inconsistency.

26. The computer-readable medium of claim 25, wherein correcting further comprises correcting the identified data for the first data inconsistency using the first correction module, when the first check module fails to includes the obstacle association, or when the first check module is associated with the obstacle association and the identified data fails to include the second data inconsistency.

27. The computer-readable of claim 20, wherein at least one of the steps of selecting, obtaining, or correcting are executed automatically when a database workload falls below a predetermined threshold.

28. The computer-readable medium of claim 20, wherein identifying comprises reading the data into a data buffer, and wherein the correcting comprises identifying the first data inconsistency in the data by accessing the data comprised in the data buffer.

29. The computer-readable medium of claim 20, further comprising repeating the steps of selecting, obtaining, identifying, and correcting until all data inconsistencies in the data have been corrected.

30. The method of claim 1, wherein the obtaining comprises:
identifying a set of correction modules associated with a corresponding first type of data inconsistency; and
selecting the first correction module from the identified set.

31. The method of claim 1, further comprising:
obtaining a second correction module when the identified data includes the second data inconsistency;
correcting the identified data for the second data inconsistency using the second correction module; and
upon correction of the second data inconsistency, correcting the identified data for the first data inconsistency using the first correction module.

32. The data processing system of claim 13, wherein the at least one processor is further configured to:
identify a set of correction modules associated with a corresponding first type of data inconsistency; and
select the first correction module from the identified set.

33. The data processing system of claim 13, wherein the at least one processor is further configured to:
obtain a second correction module when the identified data includes the second data inconsistency;
correct the identified data for the second data inconsistency using the second correction module; and
upon correction of the second data inconsistency, correct the identified data for the first data inconsistency using the first correction module.

* * * * *